Figure 1:
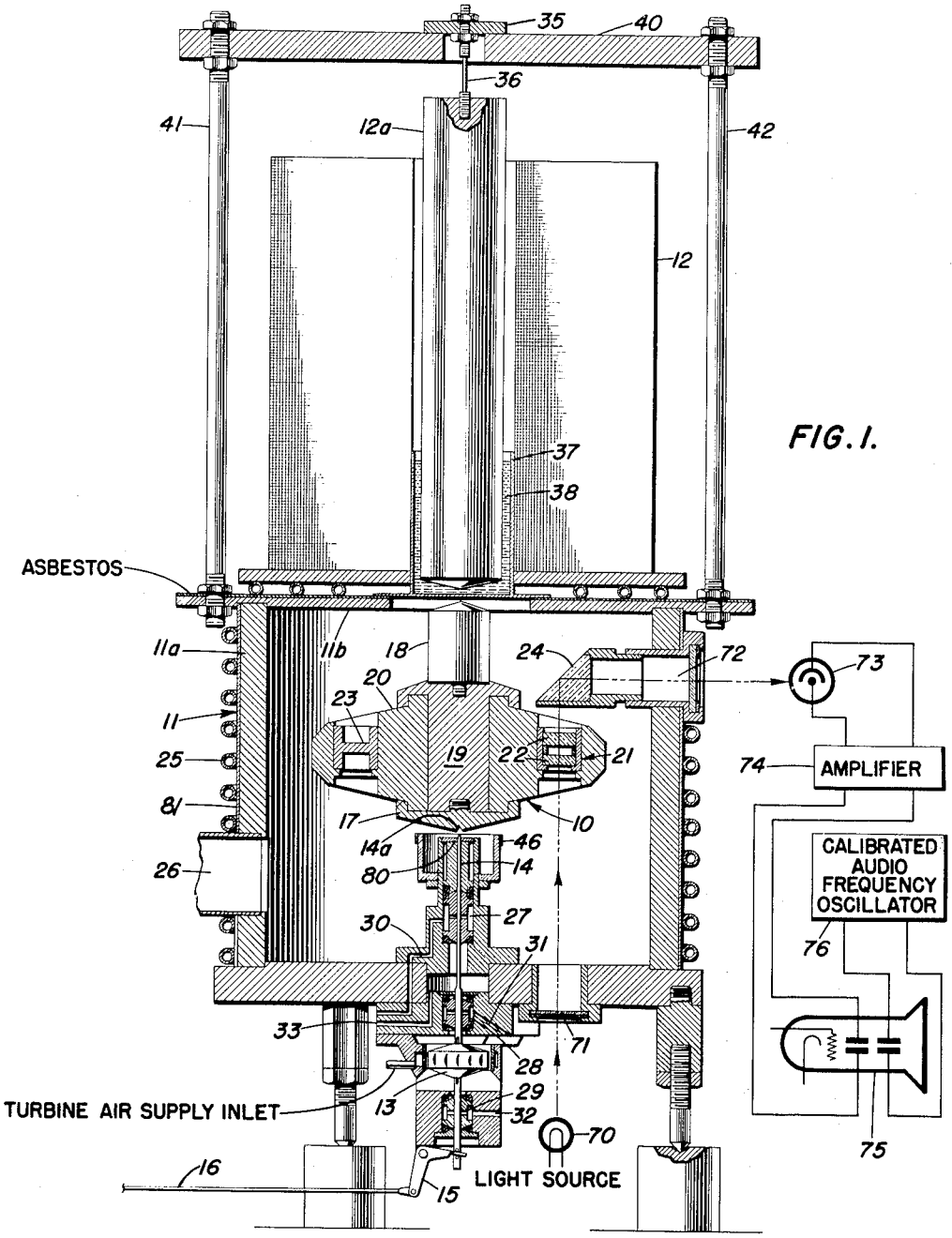

JESSE W. BEAMS
INVENTOR.

United States Patent Office 2,733,857
Patented Feb. 7, 1956

2,733,857

MAGNETICALLY SUPPORTED ULTRACENTRIFUGE

Jesse W. Beams, Charlottesville, Va., assignor to the United States of America as represented by the Secretary of the Navy Application January 30, 1952, Serial No. 269,097

7 Claims. (Cl. 233—24)

This invention relates generally to high speed centrifuges and more particularly to an improved ultracentrifuge which is particularly useful as a research tool for determining the molecular weights of high molecular weight substances.

There are two general methods which make use of the ultracentrifuge for the determination of molecular weights or particle sizes. The first is known as the rate of sedimentation method and requires a centrifugal field large enough to produce an easily measurable rate of sedimentation. The second is known as the sedimentation equilibrium method and requires centrifuging to continue long enough for the sedimentation to be balanced by back diffusion, i. e., until the equilibrium is established. The first method usually requires at most only a few hours, while the second method may require several days of centrifuging. Each method has its special uses but the theory employed by the second method is considered to be more reliable because it is based directly upon thermodynamics.

In both of the above methods the temperature and rotational speed not only must be known with precision but must be held as nearly constant as possible. Also, thermal gradients in the rotor or "hunting" in the rotor speed greatly reduce the reliability of the results obtained. This is especially true in the second or equilibrium method, where centrifuging must be continued for long periods of time.

One of the principal objects of the present invention, therefore, is to provide an ultracentrifuge employing a rotor which is suspended magnetically in a vacuum, so that rotor temperature and speed can be precisely determined.

A further object of the invention is to provide an ultracentrifuge wherein rotor friction is so reduced as to be negligible.

Another object of the invention is to provide an ultracentrifuge wherein thermal gradients and temperature changes in the rotor, as well as "hunting" in the rotor speed, are practically eliminated.

A further object of the invention resides in the provision of simple and effective means for releasing a rotor from its driving turbine after said rotor has reached the desired running speed.

Other objects and many of the attendant advantages of this invention will appear hereinafter.

The improved ultracentrifuge which constitutes the present invention includes a rotor which is suspended inside a vacuum chamber by a solenoid, and is accelerated to operating speed by an air turbine mounted below the chamber. The turbine is connected to the rotor by a clutch which is released when operating speed is reached, so that said rotor will be freely suspended and will coast during observation of the centrifuging operation. Such observation is accomplished optically by passing a beam of light through a cell in the rotor, and through windows and a prism in the vacuum chamber. Moreover, the rotational speed of the rotor is determined by a photoelectric cell pick-up system according to which some of the light from the beam passing through the cell in the rotor impinges on a photoelectric cell, for developing a signal pulse. This signal pulse is amplified and applied to one pair of plates of a cathode ray tube, the other pair of plates of said tube being connected to a calibrated audio frequency oscillator. In this way the frequency of the signal pulse from the rotor can be made to correspond to the signal of known frequency from the oscillator and the speed of rotation of the rotor thus determined. Rotor speeds are ordinarily chosen to be near a fundamental or harmonic of the frequencies of the Bureau of Standards radio station WWV.

The supporting solenoid is included electrically in a support circuit which comprises an oscillator, cathode follower-detector, a mixer for combining a signal and its time derivative, which are obtained from the cathode follower-detector, a power output stage which includes the winding of the solenoid in its plate load circuit, and an appropriate power source. The oscillator is of the tuned grid-tuned plate type, and its grid coil is located physically just beneath the rotor so that its impedance is increased or decreased as the rotor moves up or down. As a result, the circuit may be adjusted so that if the rotor rises, the current in the solenoid is decreased, whereas if said rotor moves downward, the solenoid current is increased. Thus, the rotor is maintained accurately in the desired vertical position, without "hunting," about one sixteenth of an inch above the upper plane of the grid coil and with its upper extremity about one eighth of an inch below the top of the vacuum chamber. That is, the rotor is freely supported in the vacuum chamber. This is accomplished by introducing a derivative or "anti-hunt" signal along with the error signal from the oscillator grid coil. It has been found that when the circuit is properly adjusted, the vertical and horizontal stability of the freely suspended rotor is such that no motion can be observed with a 50-power microscope focused on scratches on the rotor.

Figure 2:
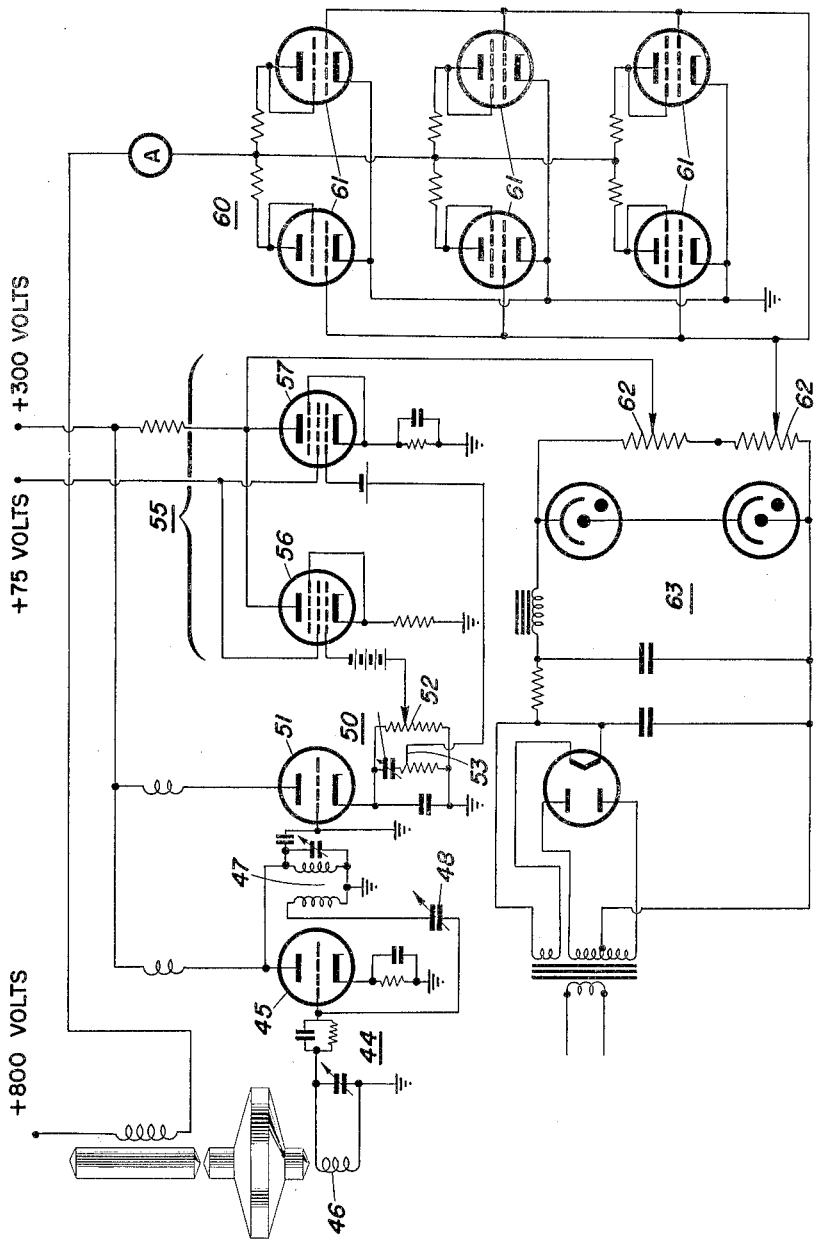

Other objects and many of the attendant advantages of this invention will be appreciated readily as the same becomes understood by reference to the following detailed description when considered in connection with the accompanying drawings, wherein:

Fig. 1 is a diagrammatic representation of the ultracentrifuge constituting the present invention; and Fig. 2 is a schematic view illustrating the rotor support circuit employed.

Referring now to the drawings in more detail, a rotor 10, of magnetic material, is freely suspended inside a brass-walled vacuum chamber 11 by a solenoid 12, and is accelerated to operating speed by an air turbine 13 which is mounetd below said chamber 11. The turbine shaft, shown at 14, is flattened throughout a portion of its length and cooperates with a slot 14a in the lower end of the rotor 10 to define a clutch. The shaft, typically $\frac{1}{16}$ in. diameter, is a hard straight steel wire. After the rotor has been accelerated to operating speed by the turbine, the rotor and turbine are disconnected manually by moving the shaft 14 downwardly along its axis, as by a lever 15 controlled by a rod 16 from outside a safety barricade.

The rotor 10 is made up of three axially symmetrical pieces of high strength steel, shown at 17, 18 and 19, and an annulus 20, of Duralumin ST14. The rotor is assembled in such a way that the pieces 17, 18, 19 carry a part of the load and prevent overstressing of the annulus 20. The bursting strength of a rotor of given shape is roughly determined by the magnitude of the ratio of the yield strength to the density of the material. This ratio is almost as large for Duralumin ST14 as for steel, although it has a specific gravity of only 2.8 as compared to 7.8 for steel. On the other hand, the yield strength of steel is much higher than the Duralumin, so that by making the steel along the axis support the surrounding Duralumin annulus 20, a strong rotor is obtained. Moreover, this construction of the rotor 10 confines the magnetic flux to regions along the axis of rotation.

A cell 21 carries the material to be centrifuged. This cell is mounted off-axis in the rotor 10 and includes a pair of spaced crystal quartz windows 22 between which the material to be centrifuged is placed. In a typical embodiment the cell is sector-shaped and has a radial length of 15 mm. Its center is 65 mm. from the axis of rotation and its quartz windows, shown at 22, are spaced 5 mm. A counterbalance 23 is located diametrically opposite the cell in the rotor. As will be obvious, although but a single cell is shown, with a counterbalance symmetrically opposite, rotors can be made with as many as eight symmetrically located cells, so that eight different tests may be carried on simultaneously in a single ultracentrifuge. It is also desired to point out that while the rotor shown is of circular cross-section, except for the cell receiving recess, other rotor designs are permissible, provided axial symmetry is retained. In fact, the only factor which limits angular rotor speed is its bursting strength. A typical rotor, such as the rotor 10, in Fig. 1, weighs 4.93 kilograms and its moments of inertia about and perpendicular to the axis of rotation are approximately $10^5$ g.-cm.$^2$ and $10^4$ g.-cm.$^2$, respectively. The length of the piece 13 is not critical and is determined by the size and position of the prism 24, to be discussed in more detail hereinafter.

The vacuum chamber 11 has a brass side wall, shown at 11a, because it must be non-magnetic and a good heat conductor. Its temperature is maintained at the desired value by circulating liquid through copper cooling tubes 25. It should be noted that the top wall 11b of the chamber 11 is relatively thin to reduce eddy currents when the current changes in solenoid 12. The vacuum chamber is evacuated through an opening 26 with an oil diffusion pump backed by a mechanical fore pump in series with Dry Ice and $P_2O_5$ traps. The pressure in the chamber is measured by an ionization gauge and must be kept well below $10^{-5}$ mm. mercury.

The air turbine drive and oil glands 27, 28 and 29 are Babbitt-lined brass bearings mounetd in flexible neoprene rings and are sealed by forcing oil through ports 30, 31 and 32. The oil in gland 27 is low vapor pressure vacuum pump oil which is carefully dried and freed from air and other gases. The small chamber between glands 27 and 28 is evacuated through port 33 to below $10^{-2}$ mm. of mercury by the fore pump.

The solenoid 12, which provides a unidirectional magnetic field, preferably consists of 28,000 turns of No. 22 enameled copper wire. Its resistance is 1200 ohms and its inductance about 70 henrys when its core 12a, of magnetic material, is in place. The operating current may be between 150 and 220 milliamperes. The core 12a is cylindrical and of soft steel. It is flexibly suspended from an adjustable brass plate 35 by a wire strand 36, in alignment with the rotor 10 so that its axis and that of said rotor are coincidental. The lower end of the core 12a is contained in a cylindrical vessel 37 containing S. A. E. #40 motor oil 38 for damping any swinging motion. The vessel 37 is preferably of non-magnetic non-conducting material, and the solenoid and core are shielded from the wall 11b of the vacuum chamber by an asbestos sheet and the coils 25. The plate 35 is supported above the solenoid 12 by a frame consisting of a top plate 40 and standards 41 and 42.

Reference is now had to Fig. 2, wherein the rotor support electric circuit is schematically represented. This support circuit comprises a three megacycle oscillator 44 of the tuned-grid tuned plate type. The oscillator includes a triode 45, an input or grid circuit having a coil 46, and a tuned output circuit 47. The output circuit is coupled to the grid of the triode 45 through a neutralizing condenser 48. The coil 46 is wound on a Lucite form (Fig. 1) two inches in diameter physically located under the rotor 20, and typically consists of 10 turns of #20 enamel copper wire. The impedance of this coil is increased or decreased as the rotor moves up or down, and hence the tuning and amplitude of the oscillator depends upon the vertical position of the rotor. As a result, the circuit may be adjusted so that if the rotor rises, the current in the solenoid 12 is decreased, whereas if said rotor moves downwardly, the solenoid current increases.

The oscillator 44 is coupled to a cathode follower detector 50, including a triode 51 and a cathode circuit comprising an error signal output 52 and a time derivative signal output 53. The error and time derivative signals are combined in a mixer stage 55 which includes pentodes 56 and 57, the anodes of which are connected in parallel and to the input of a power stage 60, shown as comprising six tetrodes 61 connected in parallel. Coupling to the power stage is made through the load resistors 62 of a bias power supply 63. The solenoid 12 is the load of the power stage 60. Bias for the pentodes 56 and 57 is provided by batteries, and positive voltages for all of the tubes are supplied by conventional power units having good regulation and capable of producing the voltages indicated by legends in Fig. 2.

The photoelectric cell pick-up system which defines a frictionless means for measuring the rotational speed of the rotor, is shown schematically in Fig. 1, and reference is again had to this view. A light source is shown at 70. This light source projects a beam of light through a window 71 in the bottom wall of the vacuum chamber 11. Thence the light passes through the cell 21 and is deflected by the prism 24 to pass through a window 72 in the wall 11a of the chamber 11. A part of the light projected from the window 72 falls on a photoelectric cell 73, and the voltage generated by the cell is magnified by an amplifier 74 and then fed to a pair of plates of a cathode ray tube 75. Another pair of plates of the tube 75 is connected to a precision audio frequency oscillator 76 calibrated to a known frequency. As explained hereinbefore, by adjusting the speed of the rotor so that the pulses developed by the photoelectric cell coincide with those of the oscillator 76, the rotor speed may be accurately determined.

To place the ultracentrifuge in operation, the brass wall 11a of the chamber 11 is first removed and the support circuit adjusted until the rotor 10 is stably supported. This circuit adjustment is carried out as follows. With the rotor 10 resting on a disk support 80, positioned coaxially of the coil 46 and guiding the upper end of the shaft 14, the current is turned on, except to the tetrodes comprising the final or output stage. The oscillator, cathode follower detector and mixer stages are adjusted for maximum output as determined by a high resistance voltmeter in the detector circuit (200 to 250 volts). The neutralizing condenser 48 is next adjusted until the voltmeter reads between 60 and 70 volts, care being taken that the oscillator continues to function with the rotor 10 in its lowest position. The output should then increase as the rotor is raised above the coil 46. The plate voltage to the tetrodes 61 is next turned on and the grid bias to the pentodes 56 and 57 adjusted and the differentiating condenser 85 varied until the rotor is stably supported as determined by putting surges on the line. The support circuit will remain in adjustment indefinitely.

The vacuum chamber 11 is next placed in position and the cell 21 filled with the material to be centrifuged. The cell is then sealed and placed in the rotor, and the rotor is placed on the disk support 80. It should be pointed out that the disk support 80 not only serves to hold the rotor while the solenoid 12 is not in operation but also operates as a safety receiver for the rotor in the event of power supply failure.

Following the above steps, the top wall of the chamber is sealed on with vacuum wax and the solenoid 12 and core 12a installed and adjusted. Meanwhile, the tubes in the support circuit have been allowed to warm, and coolant is circulated in the coils 25. Vacuum pumps (not shown) connected to the pipe 26 and to the port 33 are then started and the rotor 10 is supported by the solenoid 12 in is running position. The shaft 14 is then raised and its upper end engaged in the slot 14a in the rotor.

When the pressure in the chamber 11 is $10^{-5}$ mm. of mercury or less, air at about 50 lbs./in.$^2$ is fed to the turbine 13 and the rotor accelerated thereby at the rate of about one rev./sec.$^2$ until operating speed is reached. The lever 15 is then shifted to release the shaft 14 from the rotor 10. The rotor then continues to coast smoothly during the period of the experiment. During rotation of the rotor, the optical system previously described is placed in adjustment.

When the pressure in the vacuum chamber 11 is well below $10^{-5}$ mm. of mercury, the rotor 10 will coast without losing more than 0.1 revolution per second per hour. It has been shown that the observed loss of speed could be accounted for entirely by air friction on the rotor, although there are no doubt extremely small losses due to the support. With this slow rate of rotor deceleration the speed can of course be very accurately determined. Also "hunting," which often occurs when the rotor drive is irregular or when the power input to the rotor is large, is eliminated entirely. With almost negligible air friction there is practically no heat generated on the rotor; and with no shaft to conduct heat to the rotor, its temperature must approach very closely the temperature of the wall 11a of the chamber 11. Moreover, the wall 11a is insulated thermally on the outside with asbestos, as shown at 31, so that the cooling coils 25 can maintain a constant uniform temperature for the chamber 11. Temperature can be measured by shielded mercury thermometers in good thermal contact with the chamber walls.

After the experiment is completed, the rotor speed is lowered by admitting some gas to the vacuum chamber 11. This gas should be hydrogen or helium. Air may be used, if desired. The only precaution required is to prevent overheating of the rotor.

An ultracentrifuge according to the present invention has been used to molecular weight determination by both the rate of sedimentation and by the sedimentation equilibrium methods. It was found to be particularly adapted to the latter method because of the long centrifuging time and the constancy of the speed and temperature required. The slight decrease in speed does not disturb the equilibrium conditions in any way. With this equilibrium method, the molecular weight $M_e$ is given by the relation:

$$M_e = 2RT \ln(C_1/C_2)/(1-dV)4\pi^2 N^2(r_1^2 - r_2^2)$$

where $C_1$ and $C_2$ are the concentrations at the radii $r_1$ and $r_2$, respectively, T the absolute temperature, V the partial specific volume, $d$ the density, and N the number of revolutions per second of the rotor. In the above experiment N could be measured to about one part in $10^5$, and T to about one part in $10^4$, which is better than $C_1$, $C_2$, and V could be measured with reliability. N especially can be measured with much greater precision if necessary. It is contemplated to increase the precision of the determination of $C_1$ and $C_2$, but there are some questions concerning the reliability of the standard methods of measuring V. However, the measurement of $M_e(1-dV)$ can be made with comparatively high precision with the ultracentrifuge herein described.

What is claimed is:

1. An ultracentrifuge comprising a rotor containing magnetic material, means positioned above said rotor for producing a unidirectional magnetic field for freely suspending said rotor, means responsive to a change of position of said rotor for varying said magnetic field to maintain the rotor freely suspended beneath the field producing means, means connected to the rotor for accelerating said rotor to operating speed, and means for disconnecting said accelerating means when the rotor attains operating speed.

2. An ultracentrifuge comprising a rotor containing magnetic material and provided with a cell for receiving material to be centrifuged, means positioned above said rotor for producing a unidirectional magnetic field for freely suspending said rotor, means responsive to a change of position of said rotor for varying said magnetic field to maintain the rotor freely suspended beneath the field producing means, mean connected to the rotor for accelerating said rotor to rotational speed, frictionless means for measuring the rotational speed of said rotor to permit a determination of the physical properties of the material within said cell, and means for disconnecting the accelerating means from said rotor upon the rotor's attaaining operational speed.

3. An ultracentrifuge, comprising a rotor containing magnetic material, a solenoid positioned above said rotor for producing a unidirectional magnet field for freely suspending said rotor, the axis of rotation of the rotor and the axis of said solenoid being in alignment, means responsive to a change of position of said rotor for varying the magnetic field to maintain the rotor freely suspended beneath said solenoid, a core of magnetic material for said solenoid, said core being flexibly mounted and extending axially of said solenoid, and means impinging on said core for damping motion of said core.

4. An ultracentrifuge, comprising a rotor containing magnetic material, a solenoid positioned above said rotor for producing a unidirectional magnetic field for freely suspending said rotor, the axis of said solenoid and the axis of rotation of said rotor being in alignment, means responsive to a change of position of said rotor for varying the magnetic field to maintain the rotor freely suspended beneath said solenoid, a core of magnetic material extending along the axis of said solenoid, means attached to one end of the core for suspending said core, the free end of said core being positioned adjacent said rotor, and means bearing on said free end for damping motion of said core.

5. An ultracentrifuge comprising a rotor containing magnetic material and being provided with a cell for receiving material to be centrifuged, a solenoid positioned above said rotor for producing a unidirectional magnetic field for freely suspending said rotor, the axis of said solenoid and the axis of rotation of said rotor being in alignment, means responsive to a change of position of said rotor for varying the magnetic field to maintain the rotor freely suspended beneath said solenoid, a core of magnetic material extending along the axis of said solenoid, means attached to the upper end of the core for suspending said core, and a vessel containing damping fluid supported adjacent the lower end of said solenoid, the lower end of the said core projecting into said damping fluid.

6. An ultracentrifuge comprising a rotor containing magnetic material, a housing enclosing said rotor, a solenoid positioned above said rotor for producing a unidirectional magnetic field for freely suspending the rotor, the axis of said solenoid and the axis of rotation of said rotor being in alignment, means responsive to a change of position of said rotor for varying said magnetic field to maintain the rotor freely suspended beneath the solenoid, an air turbine supported adjacent said housing and accelerating said rotor to operational speed, a drive connection between said air turbine and said rotor, and means for disengaging said drive connection upon the rotor's attaining said operational speed.

7. An ultracentrifuge comprising a rotor containing magnetic material, a housing enclosing said rotor, a solenoid positioned above said rotor and arranged coaxially with the axis of rotation of said rotor, said solenoid producing a unidirectional magnetic field for freely suspending the rotor, means responsive to a change of position of said rotor for varying said magnetic field to maintain the rotor freely suspended beneath said solenoid, a shaft slidably supported in said housing beneath said rotor, said rotor being provided with a recess for receiving one end of said shaft thereby providing a driving connection between the shaft and rotor, an air turbine carried on said shaft, means directing a stream of air onto the turbine for accelerating the rotor to operating speed, and means for disconnecting the drive shaft from the rotor upon said rotor's attaining said operating speed.

References Cited in the file of this patent

UNITED STATES PATENTS

| | | |
|---|---|---|
| 2,209,723 | Ayres | July 30, 1940 |
| 2,256,937 | Beams et al. | Sept. 23, 1941 |
| 2,377,175 | Peer | May 29, 1945 |
| 2,566,221 | Lovell | Aug. 28, 1951 |
| 2,648,636 | Ellis et al. | Aug. 11, 1953 |

OTHER REFERENCES

"Review of Scientific Instruments," vol. 10, pp. 59–63, Feb. 1939, article by Beams and Black. (Copy in Division 55).

"Review of Scientific Instruments," vol. 9, pp. 413–416, Dec. 1938, article by J. W. Beams.

"Science in Progress," 1940, Yale University Press, article entitled "The Ultra Centrifuge" by J. W. Beams.